United States Patent [19]

Cooper

[11] Patent Number: 4,513,580
[45] Date of Patent: Apr. 30, 1985

[54] COMBINED REFRIGERATION AND HEATING CIRCUITS

[76] Inventor: Donald C. Cooper, 124B Reigate Rd., Ewell, Surrey, England

[21] Appl. No.: 543,072

[22] Filed: Oct. 18, 1983

[30] Foreign Application Priority Data

Oct. 21, 1982 [GB] United Kingdom ............... 8230081

[51] Int. Cl.³ .............................................. F25B 39/04
[52] U.S. Cl. ..................................... 62/183; 62/238.6
[58] Field of Search ............................. 62/183, 238.6

[56] References Cited

U.S. PATENT DOCUMENTS

| | | | |
|---|---|---|---|
| 3,188,829 | 6/1965 | Siewert et al. | 62/183 X |
| 3,922,876 | 12/1975 | Wetherington, Jr. et al. | 62/183 X |
| 4,238,931 | 12/1980 | Campbell | 62/183 |
| 4,321,797 | 3/1982 | Yaeger et al. | 62/238.6 X |
| 4,356,706 | 11/1982 | Baumgarten | 62/238.6 |
| 4,429,547 | 2/1984 | Granryd | 62/183 X |

FOREIGN PATENT DOCUMENTS

| | | |
|---|---|---|
| 1466980 | 3/1977 | United Kingdom . |
| 1532222 | 11/1978 | United Kingdom . |
| 2067275 | 7/1981 | United Kingdom . |

Primary Examiner—Lloyd L. King
Attorney, Agent, or Firm—Florence U. Reynolds

[57] ABSTRACT

A de-superheater is positioned between the compressor and the condenser of a refrigeration circuit and a pump circulates heat-transfer fluid past the de-superheater to heat it to a temperature higher than fluid heated by the condenser. The de-superheater is by-passed by a refrigerant line and a valve controls the amount of refrigerant passing through the de-superheater in accordance with the demand for the heated fluid as sensed by a temperature sensor at the heated fluid outlet of the de-superheater. The pressure of the refrigerant entering the condenser is measured to determine the amount of heat being taken therefrom. If this is insufficient to allow condensation of refrigerant to be completed in the condenser, a heat exchanger and a variable speed fan provide additional cooling of the refrigerant to ensure its complete condensation.

8 Claims, 2 Drawing Figures

COMBINED REFRIGERATION AND HEATING CIRCUITS

BACKGROUND OF THE INVENTION

This invention relates to combined refrigeration and heating circuits.

The molding of thermoplastic raw material involves the heating up of the raw material to the molding temperature, often with preliminary drying, and the subsequent cooling of the molded product. It is clearly uneconomic to have the heating and drying systems separate from the chilling system. Moreover, separate chilling plant poses the problem of what to do with the extracted heat. Use of a cooling tower raises in turn problems of corrosion, biological growth and scale formation, while the wasteful use of mains water for cooling is prohibited by most water authorities, as is the disposal of heated water into rivers or drainage systems. Air cooling solves many of these problems and is now widely employed.

Clearly, however, the consumption of energy for heating and drying the plastics raw material and the subsequent disposal of heat from the chilling plant is wasteful and the utilization of the exhaust heat is desirable.

One problem that arises from the utilization of heat taken from the condenser of a chilling system is that of inadequate cooling of the condenser for efficient operation of the chilling system if insufficient heat is being taken from the system utilizing the extracted heat.

Our earlier UK Application No. 2 067 275 A solved this problem by providing sensing means for sensing when insufficient heat was being taken from the condenser to permit condensation of all the refrigerant passing therethrough and cooling means responsive to said sensing means for additionally cooling the refrigerant to ensure complete condensation thereof.

However, not only is the amount of heat recovered important, but also its quality, i.e., its temperature. Our earlier system, because of the limitations imposed by the requirements of efficient condensation, could not deliver air or water heated by the condenser to a temperature of more than 60° C., the maximum operating temperature of the condenser. While such a temperature is suitable for many applications it is desirable for some other applications to have available a heat transfer fluid heated to temperatures of up to 90° C. It is also air at this temperature that is required for many heating and drying applications in thermoplastic molding processes.

SUMMARY OF THE INVENTION

According to the present invention useful heat at a temperature higher than that provided by the circuits described in our earlier Application is made available by providing, between the compressor and condenser of the refrigeration circuit, a de-superheater and circulation means for circulating heat transfer fluid past the de-superheater whereby it is heated to a temperature higher than the operating temperature of the condenser.

The de-superheater is preferably provided with a by-pass line and a diverter valve so that refrigerant may flow directly from the compressor to the condenser if high temperature heat is not required.

A combined refrigeration and heating circuit according to the present invention can thus provide chilled water, from the evaporator; lower-temperature hot water, from the condenser; and higher-temperature hot water, from the de-superheater. Moreover, in the circuit according to the present invention the de-superheater, when operative, ensures that refrigerant entering the condenser is cooled to a lower temperature and is thus more suitable for condensation. By the use of thermostatic mixing valves the circuit according to the present invention can provide a supply of water at any desired temperature between chilled and near boiling.

The circuit according to the present invention is thus particularly useful for transferring heat taken from molded plastics products at the cooling stage to earlier stages in the process where it can be used for heating stored raw material (particularly where low ambient temperatures prevail); pre-heating the raw material; drying the raw material; and heating various parts of a plastics molding machine. The heat may also be utilized for providing heating and hot water for the factory space and adjacent offices.

The circuit may be housed in a single cabinet enabling it to be sited where air heated by the additional cooling means can be directly utilized for space heating, for example the factory floor. Choice of location is widened by the fact that long runs from the points of connection to the various circuits can be tolerated.

To achieve the highest possible condensation temperature of the refrigerant it is desirable to use a refrigerant higher than that for which the compressor is designed; for example by using R12 refrigerant with a compressor designed for use with R22 or R502 refrigerant. A higher condensation temperature can thus be achieved without compromising the condensation efficiency and the heat is extracted from the condenser at a higher, more useful temperature in the region of 60° C. This is particularly important where the heat is to be used for space heating by hot air as the evaporative cooling of the human body engendered by the high flow rates necessary will still cause the occupants to feel cold unless the air temperature is sufficiently high.

BRIEF DESCRIPTION OF THE DRAWINGS

An embodiment of the present invention will now be described, by way of example, with reference to the accompanying drawings in which.

DETAILED DESCRIPTION

Figure 1:
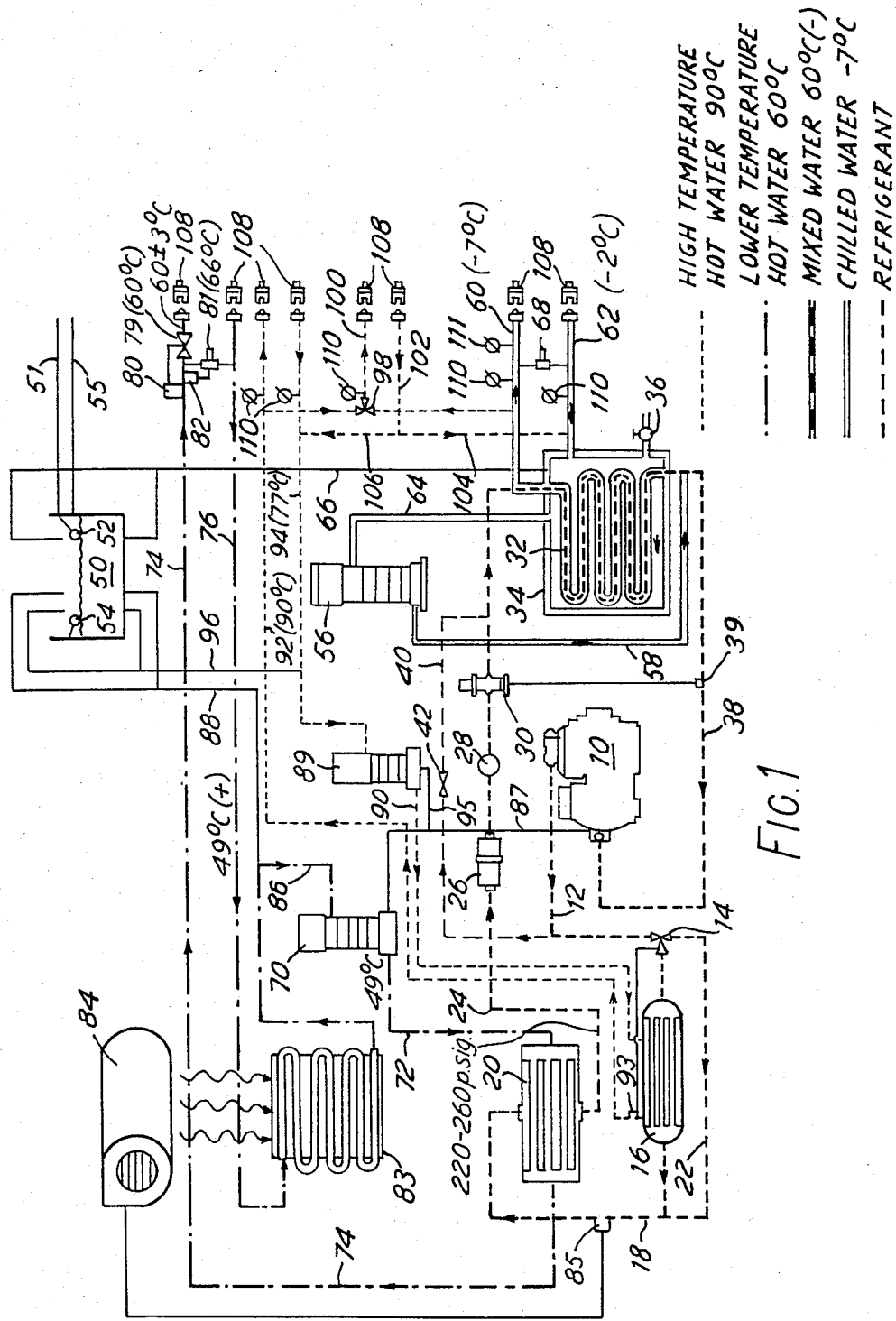
FIG. 1 is a diagram of a combined refrigeration and heating circuit according to the invention; and, FIG. 2 is a simplified perspective flow diagram of a modification of the circuit of FIG. 1 in combination with a plastics injection moulding machine.

As shown in FIG. 1 a refrigeration circuit comprises compressor 10 arranged to pump refrigerant through line 12 and three-way diverter valve 14 to de-superheater 16 and thence through line 18 to condenser 20. A by-pass line 22 connects three-way valve 14 to line 18. From condenser 20 line 24 leads via drier 26, sight glass 28 and thermal expansion valve 30 to counter-flow coaxial evaporator 32 immersed in insulated tank 34 which is drained by tank drain 36. The outlet from evaporator 32 is connected to compressor 10 by line 38 which is provided with temperature sensor 39 linked to valve 30. A hot-gas by-pass line 40 connectes line 12 through hot gas by-pass valve 42 to line 24.

A chilled water circuit, a lower-temperature hot water circuit and a higher-temperature hot water circuit are each fed from a feed and expansion tank 50 supplied from the mains water supply 51 through a make-up valve 52, and also incorporating a float switch 54 and over-flow connection 55. Chilled water pump 56 circulates water around the chilled water circuit through the evaporator 32 via line 58 and from the evaporator to the process via flow line 60. Tank 34 receives water from the process via return line 62, the circuit from tank 34 to pump 56 being completed by line 64. Make-up water from tank 50 is supplied through pipe 66. The flow line 60 and return line 62 are connected through a pressure-relief valve 68.

Water is driven round the lower-temperature hot water circuit by pump 70 to the tube side of condenser 20 by line 72 and from thence to the process through flow line 74. Flow is controlled by valve 79 set to open on a rise in temperature above 60° C. as sensed by sensor 80. Return line 76 is connected to flow line 74 through valve 81 set to open on a rise in temperature above 66° C., as sensed by sensor 82 also in flow line 74, and leads to water cooler 83. Cooler 83 is cooled by variable speed centrifugal fan 84 electrically connected to sensor 85 on refrigerant line 18 to condenser 20. Return line 86 runs from cooler 83 to the suction side of pump 70. Pump 70 is electrically connected to compressor 10 by lead 87 so as to be operative only when compressor 10 is running. The lower temperature hot water circuit is made up through line 88.

Water is driven round the higher-temperature hot water circuit by pump 89 connected to de-superheater 16 by line 90, the flow connection to the process being through line 92 which is provided with thermostat 93 linked to diverter valve 14, and the return connection to the pump being through line 94. Pump 89 is connected to compressor 10 by lead 95 in a similar manner to pump 70. Make-up water is supplied from tank 50 via line 96.

Flow line 60 of the chilled water circuit is connected to flow line 92 of the de-superheater circuit through a thermostatic mixing valve 98 having outlet connection 100 to provide intermediate temperature hot water. Connections are made to respective return lines 62,94 through lines 102,104 and 106. Each of the flow and return lines 60,62, 74,76, 92,94, 100,102 of the various water circuits is fitted with a quick change self-sealing connection 108 and lines 60,62, 92,94 and 100 with a temperature sensor 110. Flow line 60 is provided with a pressure gauge 111.

In operation, compressor 10 pumps refrigerant around the refrigeration circuit in the normal way providing a supply of chilled water for the process, the chilled water being driven around the chilled water circuit by pump 56. A typical working temperature in flow line 60 is −7° C. and in return line 62, −2° C. If the chilled water is not being used for cooling the process pressure-relief valve 68 opens to ensure continued water circulation directly between flow line 60 and return line 62.

If higher-temperature hot water is required valve 14 operates to allow passage of refrigerant through de-superheater 16 and pump 89 is switched on to pump water round the higher-temperature hot water circuit, a typical water temperature in line 92 to a secondary process being 90° C. and in line 94, 77° C. Passage of refrigerant through de-superheater 16 is controlled by valve 14 in response to thermostat 93.

Lower-temperature hot water is derived from condenser 20 and is pumped round the circuit by pump 70. The condenser 20 is designed to work at a water inlet temperature in line 72 of 49° C., a water outlet temperature in line 74 of 60° C., and refrigerant pressure of 220 to 260 psig. When there is a demand for lower-temperature hot water valve 79 opens in response to temperatures of greater than 60° C. in flow line 74 as sensed by sensor 82 and throttles the flow to maintain a temperature of 60±3° C. Valve 81 which has a set point of 66° C. remains closed. When there is no demand for hot water (no flow in line 74) valve 81 opens fully in response to a rise in temperature in flow line 74 to over 66° C. to connect flow line 72 to return line 74.

If there is a full demand for lower-temperature hot water sufficient heat is removed from the return water to reduce the temperature in line 72 to 49° C., i.e. the demand for heat matches that removed from condenser 20 which then operates efficiently. However, with a reduced demand or no demand the temperature in return line 76 rises above 49° C.; this rise is reflected in a rise in refrigerant pressure in line 18 as sensed by sensor 85 and fan 84 is operated sufficiently to cool the water temperature in return line 72 to 49° C. and thus reduce refrigerant pressure in condenser 20 to keep it within its efficient operating range of 220 to 260 psig. It will be apparent that with fan 84 operating at full speed cooler 83 is capable of dissipating all the heat removed from condenser 20.

Water at any temperature between −7° C. and 90° C. can be obtained by setting the valve 98 to the desired temperature. Alternatively a number of thermostatic mixing valves (not shown) can be connected up to chilled water flow line 60 on the one hand and hot water flow line 74 or 92 on the other hand.

The above-described circuit may be installed in a single cabinet 114 (see FIG. 2) having compressor 10 and tank 34 at the base to facilitate gravity return applications, and de-superheater 16, condenser 20, and pumps 56, 70 and 89 mounted thereabove. At this level the side wall of the cabinet 114 incorporates an air inlet grille 116. The fan 84 and tank 50 are mounted above the other components and surmounted by an exhaust air spigot connected to a duct 118 through which in summer exhaust air from the condenser 83 is fed to atmosphere. Opposite the duct 118 there is located grille 120 fitted with vertical and horizontal adjustable louvres to allow space heating with waste heat in winter at a height sufficient to avoid draughts.

The circuit is preferably provided with an audiovisual alarm to indicate any malfunction.

Figure 2:
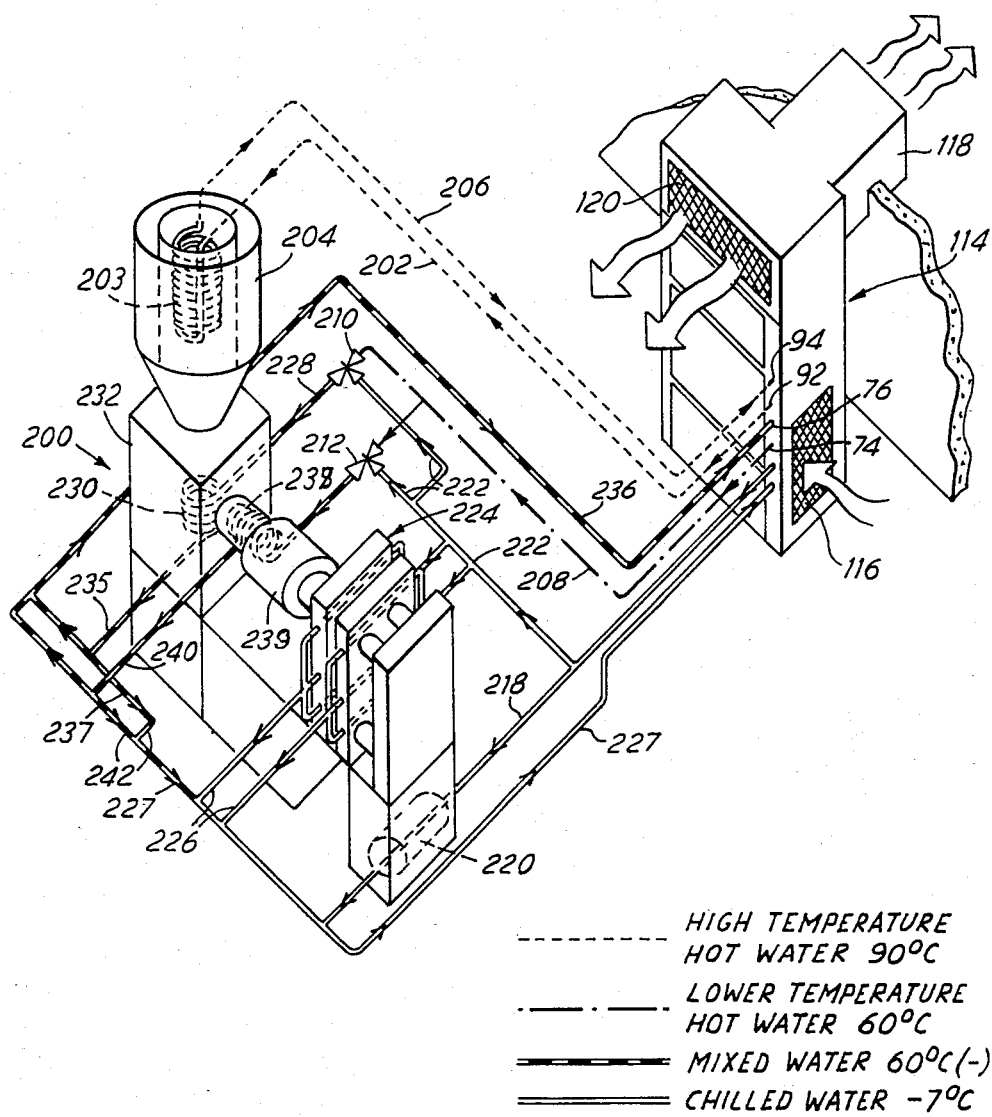

FIG. 2 shows in much simplified form how the circuit of FIG. 1 is connected to a thermoplastics injection molding machine 200. In this case the flow connection 100 and return connection 102 of the intermediate temperature hot water circuit are not used. The connection 108 of flow line 92 of the higher-temperature hot water circuit is connected to line 202 leading to coil 203 in an insulated hopper 204 of the machine 200, return to line 94 being via line 206.

The connection 108 of flow line 74 of the lower-temperature hot water circuit is connected to line 208 which runs to thermostatic mixing valves 210 and 212.

Connection 108 of chilled water flow line 60 is connected to line 218 which leads to hydraulic oil cooler 220 and has branched connections 222 to mold 224. Return to line 62 is by lines 226 and common line 227. Valves 210,212 also receive chilled water via branched connections 222.

Line 228 leads from mixing valve 210 to coil 230 in throat and feed zone 232. Return to lower-temperature hot water line 76 is via lines 235 and common line 236 and return to chilled water line 62 is via line 237 and line 227. Mixing valve 212 is connected to coil 238 in screw zone 239. Returns are via line 240 to common line 236 and line 242 to line 227.

Thus, 90° C. hot water is fed to hopper 204 to preheat and dry raw material therein; feed zone and throat 232 and screw zone 239 are heated to desired temperatures by use of the mixing valves 210,212 to mix 60° C. water and chilled water; and the mold 224 and oil cooler 220 are chilled to −7° C. The energy used for all the heating stages is recycled waste heat from the chilling process.

An idea of the energy savings that can be made by the use of the above-described circuit can be gauged from the fact that only 1 unit of energy is required whereas 3.8 units would be required if the chilling and heating functions were performed separately.

I claim:

1. A combined refrigeration and heating circuit comprising a refrigerant, a compressor for compressing the refrigerant in gaseous form, a condenser, means for circulating the compressed refrigerant to the condenser where it is condensed to a liquid, an evaporator, means for circulating the liquid refrigerant to the evaporator where it becomes a gas, means for circulating the evaporated refrigerant gas back to the compressor, a heating circuit for circulating heat-transfer fluid heated by heat taken from the condenser, sensing means for sensing the amount of heat being taken from the condenser, cooling means responsive to said sensing means for additionally cooling the refrigerant to ensure complete condensation thereof if insufficient heat is being taken from the condenser to allow condensation of refrigerant to be completed therein, a de-superheater arranged between the compressor and the condenser and circulation means for circulating heat transfer fluid past the de-superheter to heat it to a temperature higher than the temperature of the heat-transfer fluid heated by the condenser, wherein the refrigerant is different from that for which the compressor was designed and chosen to obtain a higher condensation temperature.

2. The circuit as claimed in claim 1, further comprising a de-superheater refrigerant by-pass line and valve means for controlling the amount of refrigerant passing through the de-superheater in accordance with the demand for said higher temperature heat-transfer fluid.

3. The circuit as claimed in claim 2 further comprising sensing means for sensing the temperature of the heated heat-transfer fluid leaving the de-superheater and wherein the valve means are responsive to said sensing means.

4. The circuit as claimed in claim 1, wherein the cooling means are arranged in series with respect to the direction of flow of heat-transfer fluid to the condenser.

5. The circuit as claimed in claim 1, wherein the cooling means comprise a heat-exchanger and delivery means for delivering a variable flow of cooling fluid thereto.

6. The circuit as claimed in claim 1, wherein the sensing means are arranged to sense the pressure of refrigerant entering the condenser.

7. The circuit as claimed in claim 1, further comprising mixmeans for mixing heated heat-transfer fluid and heat-transfer fluid chilled by the evaporator to obtain mixed fluid at a desired intermediate temperature.

8. The circuit as claimed in claim 1, further comprising a cabinet housing all components of the circuit.

* * * * *